US006159378A

United States Patent [19]

Holman et al.

[11] Patent Number: 6,159,378

[45] Date of Patent: Dec. 12, 2000

[54] APPARATUS AND METHOD FOR HANDLING MAGNETIC PARTICLES IN A FLUID

[75] Inventors: David A. Holman, Richland; Jay W. Grate, West Richland; Cynthia J. Bruckner-Lea, Richland, all of Wash.

[73] Assignee: Battelle Memorial Institute, Richland, Wash.

[21] Appl. No.: 09/255,758

[22] Filed: Feb. 23, 1999

[51] Int. Cl.[7] .................................................... B01D 35/06

[52] U.S. Cl. ...................... 210/695; 210/222; 209/223.1; 209/232; 436/526

[58] Field of Search ................................ 209/223.1, 232; 210/222, 695; 436/526

[56] References Cited

U.S. PATENT DOCUMENTS

| | | | |
|---|---|---|---|
| 4,208,277 | 6/1980 | Lofthouse et al. | 210/222 |
| 4,375,407 | 3/1983 | Kronick | 209/8 |
| 4,664,796 | 5/1987 | Graham et al. | 210/222 |
| 5,200,084 | 4/1993 | Liberti et al. | 210/695 |
| 5,385,707 | 1/1995 | Miltenyi et al. | 422/69 |
| 5,411,863 | 5/1995 | Miltenyi | 435/6 |
| 5,541,072 | 7/1996 | Wang et al. | 435/7.21 |
| 5,543,289 | 8/1996 | Miltenyi | 435/2 |
| 5,622,831 | 4/1997 | Liberti et al. | 435/7.21 |
| 5,693,539 | 12/1997 | Miltenyi et al. | 436/526 |
| 5,698,271 | 12/1997 | Liberti et al. | 427/550 |

*Primary Examiner*—David A. Reifsnyder
*Attorney, Agent, or Firm*—Paul W. Zimmerman

[57] ABSTRACT

The present invention is an apparatus and method for handling magnetic particles suspended in a fluid, relying upon the known features of a magnetic flux conductor that is permeable thereby permitting the magnetic particles and fluid to flow therethrough; and a controllable magnetic field for the handling. The present invention is an improvement wherein the magnetic flux conductor is a monolithic porous foam.

22 Claims, 5 Drawing Sheets

APPARATUS AND METHOD FOR HANDLING MAGNETIC PARTICLES IN A FLUID

This invention was made with Government support under Contract DE-AC0676RLO1830 awarded by the U.S. Department of Energy. The Government has certain rights in the invention.

FIELD OF THE INVENTION

The present invention relates to an apparatus and method for handling magnetic particles in a fluid.

BACKGROUND OF THE INVENTION

Separation of magnetic particles from a fluid has been known as magnetic separation or high gradient magnetic separation (HGMS) for about 40 years. In magnetic separation, particles of larger (d≧0.5 micron) are captured or separated and in HGMS, smaller particles are separated, for example colloidal magnetic particles. Magnetic particles are today widely available commercially, typically 1 micron in diameter, with or without functional groups capable of binding antibodies or DNA molecules or containing other binding sites for sample purification. Several commercial systems automate sample purification and detection using magnetic particles, the systems ranging in size from desktop to bench size.

Over the past decade, sub-millimeter-scale, automated flow-based analyzers and chemical detector arrays have steadily approached the technology level needed for commercialization. Development is continuing toward ever more compact (briefcase size) medical diagnostic analyzers for automated immunoassays, DNA purification and amplification, cell separation, etc. Despite the advances in miniaturization, particle handling has remained somewhat unchanged.

Automation has been primarily with robotic imitation of manual procedures for handling the magnetic particles (Immunoassay Automation, Editor D. W. Chan, 1996, Academic Press) These systems include capture of the magnetic particles by placing the magnetic particle suspension in a container that is located in a magnetic field gradient (e.g. above a magnet), so that the magnetic particles settle and are held at the bottom of the container.

Baxter Biotech Immunotherapy has a system that includes stationary capture followed by capture during continuous flow. Their system includes collection of most of the magnetic particles in a stationary reservoir above a magnet, followed by flow of the remaining solution over another magnet to remove any magnetic particles that were not captured in the first stage (Cell Separation Methods and Applications, E. Recktenwald, A. Radbruch, Eds., 1998, Marcel Dekker, pg 193). All of these systems include particle capture only at the walls of the reservoirs or tubing, and the vast majority of the magnetic particles are held within one container while solution is decanted and added.

Pollema and Ruzicka (C. H. Pollema, J. Ruzicka, G. D. Christian, and A Lernmark, Analytical Chemistry, volume 64, pages 1356–1361, 1992) describe a method for handling magnetic particles in a flow system, however, their system includes particle capture only at the tubing walls, and therefore does not allow for efficient perfusion of captured particles. Similarly, R. Kindervater, W. Kunneke, and R. D. Schmid (Analytical Chimica Acta, volume 234, pages 113–117,1990) describe a magnetic capture device consisting of tubing in close proximity to a magnet as part of a flow system. S. Sole, S. Alegret, F. Sespedes, E. Fabregas, and T. Diez-Caballero describe a flow system using magnetic capture of beads at a planar sensor surface, using a magnet external to the flow path. This geometry does not provide efficient perfusion through a bed of magnetic particles.

Separations of colloidal superparamagnetic particles (20 nm to 100 nm in size) are done using high gradient magnetic fields in an apparatus as shown in FIG. 1. Magnetic particles 100 in a fluid 102 flow through a magnetic flux conductor 104 that is permeable. These are generally contained in a column 106 and a controllable magnet 108 external to the column 106 is used proximate the magnetic flux conductor 104 for adjusting the magnetic field within the magnetic flux conductor.

The flux conductor 104 was magnetic grade stainless steel wool 110 in U.S. Pat. Nos. 3,567,026 and 3,676,337 (1971). In U.S. Pat. No. 4,247,389 (1981), the stainless steel of the steel wool 110 was replaced with an amorphous metal alloy containing iron and cobalt.

Because bare metal contributed to oxidation of biological species, U.S. Pat. No. 4,375,407 (1983) presented a polymer coated steel wool (not shown) or filamentary magnetic material. Additional U.S. Pat. Nos. (5,385,707,1995; 5,411, 863, 1995; 5,543,289,1996; 5,693,539,1997) rely on the use of polymer coated filamentary magnetic material alone or in combination with functionalized beads.

For capture of blood cells, U.S. Pat. No. 4,664,796 (1987) discusses magnetic spheres in combination with filamentary magnetic material.

Alternative forms of flux conductor 104 are discussed in U.S. Pat. Nos. 520,000,084,1993; 5,541,072, 1996; 5,622, 831,1997; 5,698,271,1997. Specifically discussed are wire loops and arrays of thin rods.

An automated separation system that includes a HGMS column is available from Miltenyi-Biotec/AmCell. They use a peristaltic pump to pull samples through a ferromagnetic column. The column is used to capture cells that are prelabeled with very small colloidal superparamagetic particles (20–100 nm in diameter) rather than larger superparamagnetic particles used for most applications (0.5–5 μm in diameter). The Miltenyi-Biotec/Amcell columns contain a closely packed bed of ferromagnetic spheres coated with biocompatible polymer. The cells that are labeled with colloidal superparamagetic particles are captured at the surfaces of the spheres within the flow path. (Cell Separation Methods and Applications, E. Recktenwald, A. Radbruch, Eds., 1998, Marcel Dekker, pg 153–171)

The three dimensional structure and distribution of the magnetic flux conductor material influences fluid flow, magnetic field flux distributions, and hence particle capture efficiency, and the ability to uniformly perfuse the particles after capture. In addition, the structural geometry and magnetic field gradient define the range of particle sizes that can be efficiently captured and released. Columns packed with filamentary magnetic flux conductor material have a non-uniform distribution of the material resulting in variable magnetic flux distributions and nonuniform fluid flow. Reservoirs containing wire loops, rods or a piece of wire mesh have more uniform structure, but still have a non-uniform distribution of material in the reservoir, and previous work does not include perfusion of these structures in a column format (U.S. Pat. No. 5,200,084). Columns packed with spherical particles provide uniform magnetic flux distributions and uniform fluid flow, however the pressure drop across the column can be high since the porosity is low (only 20% porous if the spheres are uniform in size and not closely packed).

Heretofore, fluid permeable magnetic flux conductors suffer from one or more of the following disadvantages: non-uniform field gradient distributions, inefficient perfusion characteristics, or low porosity. First, the maximum distance from a particle to a flux conductor surface is not sufficiently small and uniform throughout the volume containing the flux conductor to promote efficient particle capture on the basis of distance to be traveled. Particles near the highest field gradient (e.g. regions of the flux conductor surface within the flow path) are captured while particles farther from the flux conductor are not captured unless the flow rate is reduced. Thus, particle capture is inefficient above a threshold flowrate that depends on the device dimensions and particle size. Non-uniform pore sizes can also lead to difficulty removing the particles if any pores are on the order of the particle size or smaller. The lack of uniformity also results in magnetic flux gradients unevenly distributed throughout the material. The present structures do not provide uniform fluid flow throughout the flow path. Therefore, particles are captured non-uniformly throughout the flow path (e.g. only at the non-uniformly distributed flux conductor surface, or regions of this surface) so that one cannot uniformly perfuse the captured particles. Some of the present structures also do not provide efficient perfusion of the flux conductor surface. [packed spheres do provide this, but suffer from low porosity and high pressure drop]. Thus, a particle traveling through the material does not necessarily come close to conductor material as it flows through the structure. An extreme example of this situation is flow through a tube of magnetic flux conducting material.

Finally, although a column of packed spheres provides the above advantages as long as the spheres are closely packed to prevent fluid channeling through large gaps, the packed bed has a low porosity (~20%) and therefore there is a high pressure drop across the magnetic flux material. In addition, the low porosity requires that the system size must be scaled up considerably to handle standard superparamagnetic particles (>0.5 micron in size) rather than just colloidal superparamagnetic particles.

Another difficulty with the prior art methods is the inability to release 100% of the magnetic particles because of residual magnetism that remains in the magnetic flux conductor. Miltenyi (1997) 5,411,863 states:

> "'Ferromagnetic' materials are strongly susceptible to magnetic fields and are capable of retaining magnetic properties when the field is removed . . . Ferromagnetic particles with permanent magnetization have considerable disadvantages for application to biological material separation since suspension of these particles easily aggregate due to their high magnetic attraction for each other."

also, at the end of column 10 and beginning of column 11,

> "A preferred embodiment shown in FIG. 1 utilized a permanent magnet to create the magnetic field . . . The magnet is constructed of a commercially available alloy of neodinium/iron/boron . . . Indeed, an electromagnet could be substituted in less preferred embodiments . . . If an electromagnet is used, the magnetic field created by the electromagnet is compensated to zero. Upon removal of the magnet field and continued flow of suspension fluid through the chamber, the retained magnetized particles are eluted from the matrix."

It is well known that compensating to zero does not eliminate residual magnetism. Thus, Miltenyi is not able to remove 100% of the magnetic particles from the matrix without high shear forces.

Thus, there is a need in the art of magnetic particle handling for an apparatus and method for magnetic particle handling that provides more uniform retention of particles and uniform flow perfusion of the retained particles, and more efficient removal of the particles for reuse of the system. The system should be suitable for handling magnetic particles ranging from about 100 nm to 10 μm in diameter or magnetic colloids ranging from about 20 to 100 nm in diameter.

SUMMARY OF THE INVENTION

The present invention is an apparatus and method for handling magnetic particles in a fluid, relying upon the known features of

- a magnetic flux conductor that is permeable thereby permitting the magnetic particles and fluid to flow therethrough; and
- a controllable magnetic field for adjusting the magnetic field within the magnetic flux conductor for handling the magnetic particles. The present invention is an improvement wherein the magnetic flux conductor is a monolithic porous foam.

A further improvement is in adjusting or controlling the magnetic field by the steps of:

(a) applying a magnetic field of a first polarity for retaining said magnetic particles in said magnetic flux conductor; and (b) reversing said magnetic field to an opposite polarity for releasing said magnetic particles from said magnetic flux conductor.

Advantages of the monolithic porous foam include greater porosity from about 80% to about 95%. Moreover, the porosity is more uniform with a pore size distribution within ±100%, preferably within ±50%. With greater porosity and more uniform porosity, there are the combined advantages of a particle retention surface which is both finely divided and uniformly distributed. The problem of preferential flow through channels is precluded by two structural features: 1) the porosity is cellular in that each open space is broadly open to each adjacent open space, and 2) the pore cells are offset from each other like close-packed spheres so that fluid flow cannot find a straight channel of least resistance longer than two adjacent pore cells. Moreover, flow may actually mix within the porous foam by the pore cells continuously dividing and recombining adjacent layers of laminar flow. In other words, the fluid flow path(s) is/are tortuous forcing the particles to come into contact with the pore wall(s). These properties of high, uniform porosity in combination with non-linear flow paths through the porous foam allow capture of magnetic particles ranging from tens of nanometers to microns in diameter. The open structure with high porosity also allows easy removal of particles from the porous foam.

Greater uniformity of pore size distribution also provides greater uniformity of particle trapping and provides relatively uniform shear forces on the surfaces within the porous foam and on the particles adhering to the surfaces. This is important because it allows control of shear forces during the separation of the particles from the fluid, and it is known that high shear forces inhibit binding such as DNA/DNA and antigen/antibody interactions. Shear force is also used to release biological cells from magnetic particles that selectively bind biological cells. In addition shear force is known to lyse biological cells or destroy biological cells so that more uniform control of shear stress is a significant asset.

Advantages of the reversing polarity is release of a greater fraction of magnetic particles up to 100% without excessive shear force applied to the magnetic particles.

It is an object of the present invention to provide an apparatus and method for magnetic material handling wherein the magnetic flux conductor is a monolithic porous foam.

It is another object of the present invention to provide a method for magnetic material handling by applying a magnetic field of a first polarity for retaining the magnetic material followed by applying an opposite polarity for releasing the magnetic material.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

The present invention is an improved apparatus and method for handling magnetic particles in a fluid, having the features

Figure 1:
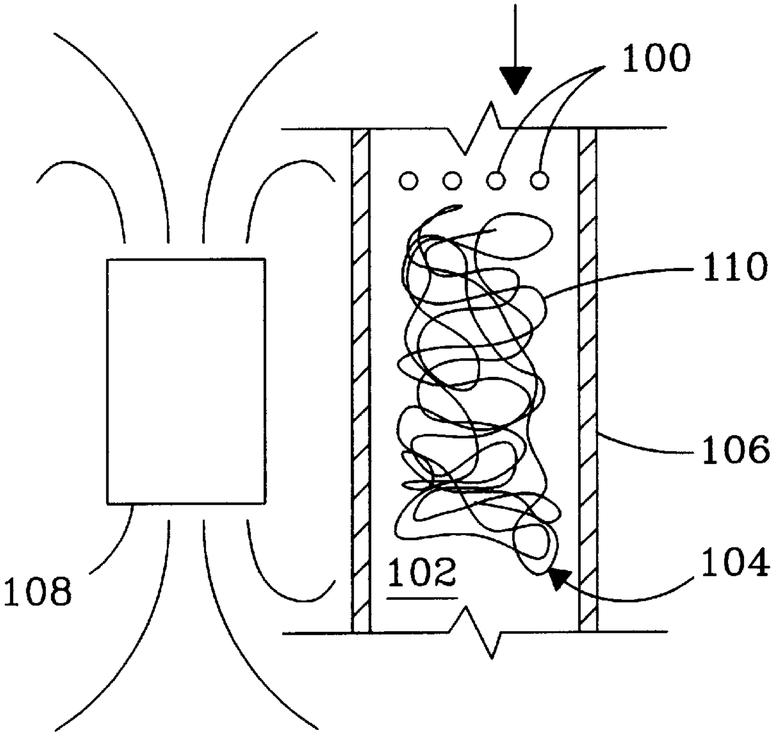
Fig. 1 (Prior Art)
FIG. 1 is a cross section of a prior art magnetic bead handling apparatus.
Figure 2:
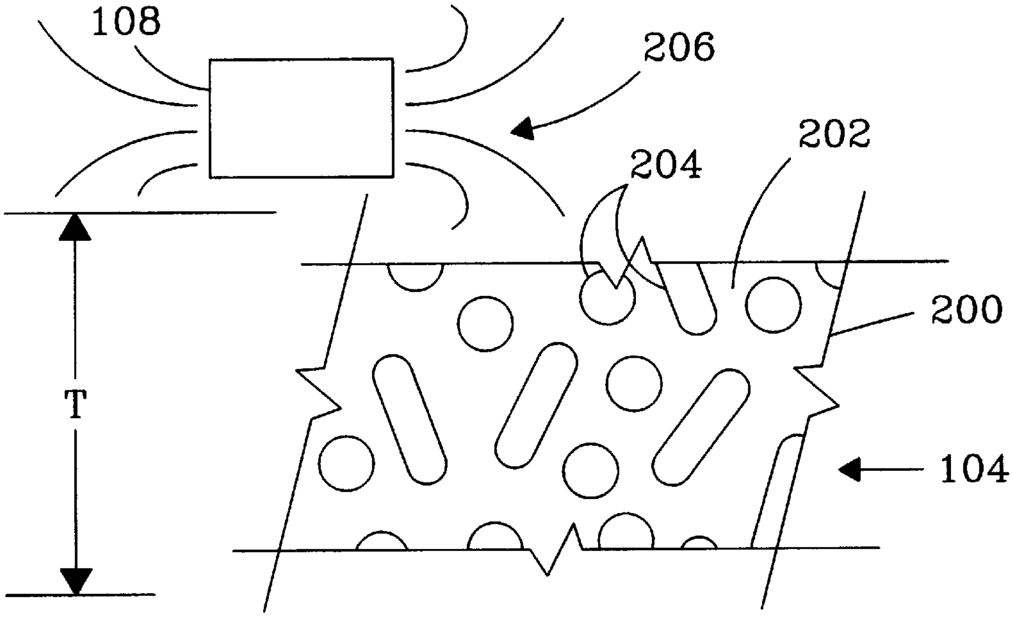
FIG. 2 is a partial cross section of a monolithic metal foam.

- a magnetic flux conductor that is permeable thereby permitting the magnetic particles and the fluid to flow therethrough; and
- a controllable magnetic field for the handling; wherein the improvement is:
- the magnetic flux conductor 104 is a monolithic porous foam 200 as shown in FIG. 2. The monolithic porous foam 200 has a continuous material web 202 that provide open pore cells 204 through which fluid and magnetic particles may flow, preferably in the flow direction indicated by thickness T.

The monolithic porous foam 200 is deployed in combination with the controllable magnetic field 206. The controllable magnetic field 206 is usually provided with a controllable magnet 108. The controllable magnet 108 may be either a permanent magnet or an electromagnet either of which is controllable either by physically moving the controllable magnet 108 proximate or distal with respect to the monolithic porous foam 200, or specifically in the case of the electromagnet, controlling an electrical input to the electromagnet. When the magnetic field gradient within the monolithic porous foam 200 is sufficiently high, the magnetic particles present within the fluid are retained on the walls 202 of the monolithic porous foam 200. When the magnetic field gradient is sufficiently low, the magnetic particles pass through the pores 204 of the monolithic porous foam 200. Flow of the fluid through the pores 204 may be by motion of the monolithic porous foam 200 through a stationary fluid, motion of the fluid through the monolithic porous foam 204 held stationary or a combination of fluid motion and monolithic porous foam 204 motion. Vibration can be used to assist in the release of particles in the case of residual magnetism. Relying on the combination of vibration and flow rather than on flow alone for removing particles accomplishes release of particles into a minimum volume of solution.

The material of the walls 204 is a magnetic material including but not limited to ferromagnetic material and paramagnetic material. Ferromagnetic materials include but are not limited to iron, cobalt, nickel, alloys thereof, and combinations thereof. The preferred embodiment is nickel and alloys thereof because of its high chemical resistance. In the preferred embodiment the particles are superparamagnetic: meaning that they have minimal or no residual magnetism when separated from the magnetic field.

The monolithic porous foam 200 is preferably a metal, but may be a non-metal with metal particles as a composite material. For example, a polymer with metal flake therein formed into a foam. The monolithic porous foam 200 may also be coated with a non-metal material.

In a preferred embodiment, there is a ratio of average pore size (diameter) to average magnetic particle size (diameter) of at least 20, and more preferably at least about 50 up to about 100. For example, for an average pore size of about 200 microns, average magnetic particle size is less than about 10 micron.

Figure 3:
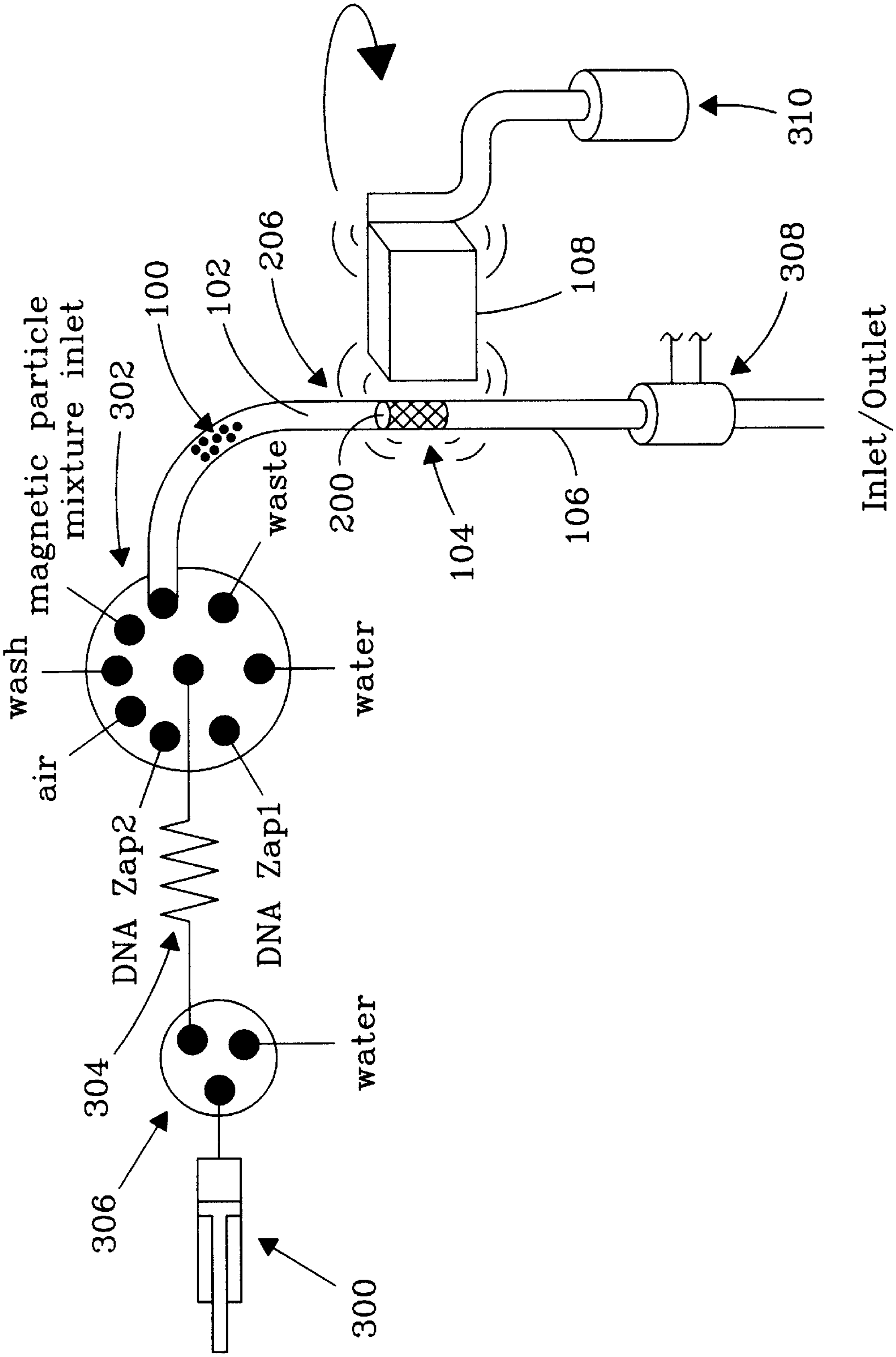
FIG. 3 is a schematic of a sequential injection flow system with a monolithic metal foam for handling magnetic particles.

In a preferred embodiment, the monolithic porous foam 200 is within a flow channel 106, for example as used in a sequential injection flow system shown in FIG. 3. A pump 300 (preferably a syringe pump) is used for fluid movement and a multi-position valve 302 may be used for fluid selection into the column 106 containing the magnetic flux conductor 104 which is the monolithic porous foam 200. The pump 300, multi-position valve 302 and magnet 108 for providing variable magnetic field 206 may be completely automated via computer (not shown). A fluid 102 with a plurality of magnetic particles 100 suspended therein is aspirated from one of the ports of the multi-position valve 302 into a holding coil 304, then the pump direction is reversed and fluid is dispensed from the holding coil 304 to the port in fluid communication with the column 106. A two-way valve 306 may be used to facilitate filling the syringe pump.

The present invention includes temperature control 308 as shown in FIG. 3. This temperature control region could also be placed on the metal foam region 104. Temperature control is useful for optimizing binding and elution rates for DNA hybridization and elution, as well as for DNA amplification using PCR (polymerase chain reaction) or other enzyme amplification methods requiring thermal cycling.

When the magnetic field 206 is applied to the monolithic porous foam 200, for example by moving the magnet 108 proximate or near to the column, the particles 100 are trapped in the column. Magnet 108 movement may be automated with a stepper motor 306. When the particles 100 are trapped, they can be perfused by solutions that are located at ports of the multi-position valve 302. Perfusion is achieved by aspirating solution from the valve port into the holding coil 304, then dispensing the solution to the column 106.

A method of contacting magnetic particles with a sample fluid, has the steps of:

(a) flowing the liquid with magnetic particles 100 therein through the monolithic porous foam 200;

(b) controlling the controllable magnetic field 206 for adjusting the magnetic field within the monolithic porous foam 200 and retaining the magnetic particles 100 within the monolithic porous foam 200; and (c) flowing the sample fluid through the monolithic porous foam 200 and contacting the magnetic particles 100 with the sample fluid.

The magnetic particles 100 are removed from the monolithic porous foam 200 by substantially decreasing or removing the magnetic field gradient 206 (by for example moving the magnet 108 distal or away from the column 106), and either aspirating or dispensing fluid through the monolithic porous foam 200 (optionally with mechanical vibration (not shown)) to carry the magnetic particles 100 out of the monolithic porous foam 200.

If desired, the magnetic particles 100 can be captured and released multiple times. This procedure could be used to enhance mixing and therefore molecular capture efficiency from a small fluid volume. This procedure may also be used to increase shear forces within the monolithic porous foam 200 in order to remove material from the magnetic particles 100 or to lyse biological cells. The capture and release can occur within the same volume of fluid by reversing the fluid flow direction across the monolithic porous foam 200 during the capture and release functions. Or, the capture and release can be into fresh volumes of fluid that are moved across the monolithic porous foam 200. In order to minimize magnetic particle 100 loss during unidirectional flow, particle release and re-capture should occur when the flow is stopped or fluid is flowing at a very slow rate over the metal monolithic porous 200.

Gentle (low shear force) handling of magnetic extraction particles is important for efficient analyte recovery. Excessive shear force of solution at bead surfaces can remove retained molecules or particles. For example, extraction and washing of DNA was not successful at flow rates higher than 30 uL/s in the Ni foam apparatus of FIG. 3. However, magnetic flux material, including Ni foam, has a residual permanent magnetism after an external magnetic field is removed. Thus, most retained beads are easily removed at flow rates less than 30 uL/s, but a fraction of beads remains because of the residual permanent magnetism. A detrimental level of shear force is required to separate the remaining fraction from the magnetic flux material back into fluid suspension.

Magnetic particles are preferably released from magnetic flux material more gently by using an electromagnet to cancel residual permanent magnetism. The magnetic flux material may be any magnetic flux material including but not limited to filamentous, wire loop, rod, monolithic porous foam and combinations thereof. An electromagnet coil wrapped around a magnetic flux material core is centrosymmetric and collinear with the core. The electromagnet's reversibility and symmetry allow for cancellation of residual permanent magnetism after a capture step by applying a weak, reversed field. Permanent magnets offer the advantages of no power consumption or heating during capture. It is possible to have both sets of advantages by applying a permanent magnet during bead capture, and then applying an electromagnet as described above for cancellation of the residual magnetic field after the permanent magnet is removed.

In a preferred embodiment, the weak reversed field is applied during perfusing. Further it is preferred to increase the reversed applied field because the particles come off over a range of reversed electromagnet current. This is a result of a distribution of residual magnetism. It may be possible to cancel a whole range of residual magnetism by sweeping over that range. The application of a reversed magnetic field is distinct from demagnitization, because the reversed magnetic field may not remove the residual magnetism. Moreover, demagnetization is for a single magnetic orientation and strength.

EXAMPLE 1

An experiment was conducted to demonstrate release and capture of magnetic particles 100 with metal foam as the monolithic porous foam 200.

Figure 4:
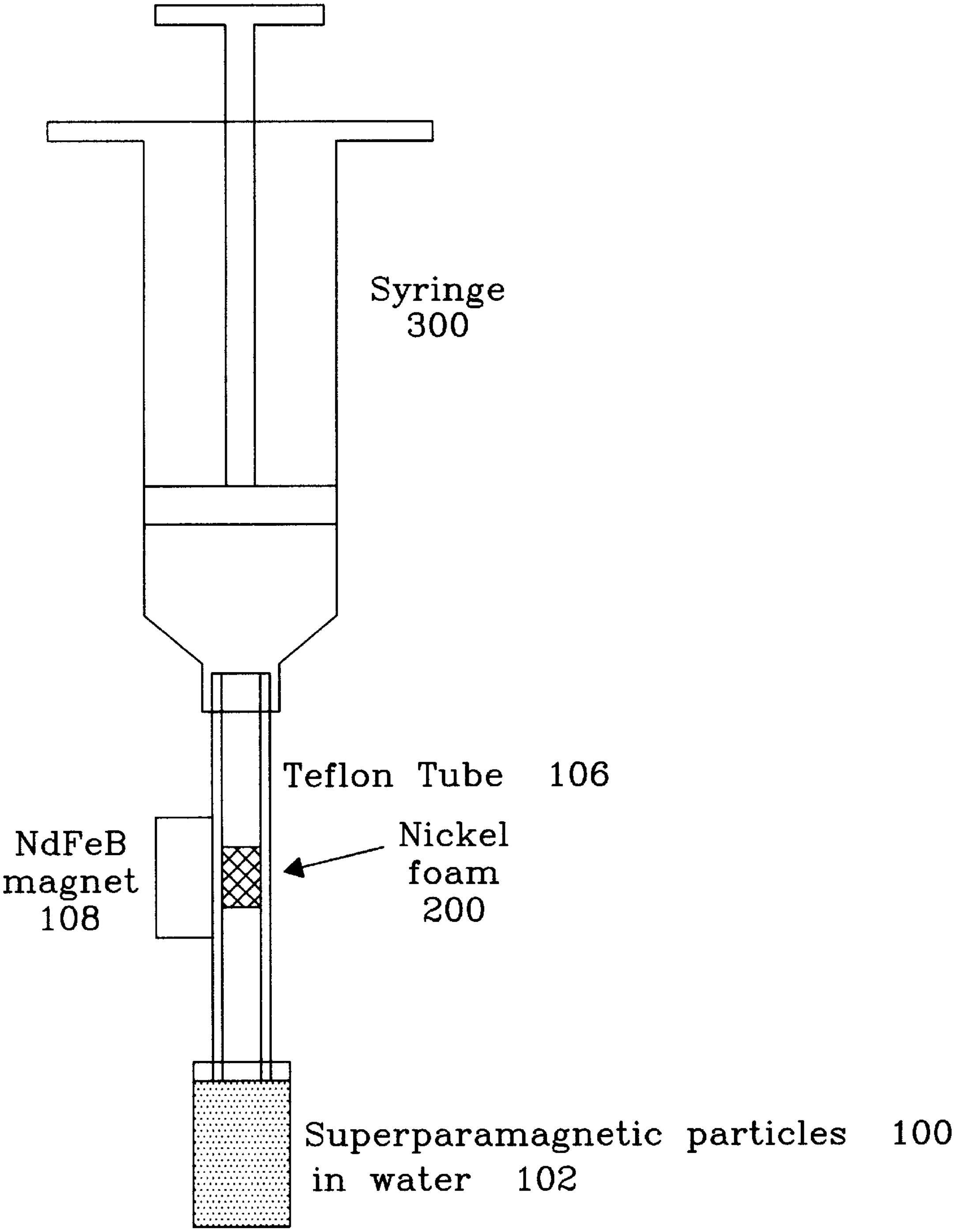
FIG. 4 is a schematic of manually operated system for handling magnetic particles (Example 1).

The experimental set up is shown in FIG. 4. The metal foam 200 was made of nickel in the shape of a cylinder. More specifically, the metal foam 200 was Astro Met Series 200 nickel foam that was 6–15% dense and contained about 80 pores per inch. The pore size of this metal foam 200 as measured by averaging 20 pores in the field of view in an optical microscope was 390±190 $\mu$m. The cylindrical shape was made by first filling the pores 204 with water and freezing it so that ice encapsulated the fragile nickel foam 200. A cork borer with 3.5 mm I.D. was then twisted through the 5 mm thick slab of ice and metal foam 200 to create the cylinder that was 3.5 mm in diameter and 5 mm in length.

The column 106 was a tube of polytetrafluoroethylene (PTFE, e.g. Teflon) having an I.D. of 3.5 mm and an O.D of 7.0 mm. The pump 300 was a 5 ml plastic syringe used to push and pull solution through the metal foam. The magnetic field 206 was provided by holding the magnet 108 (a NdFeB magnet (12×6×8 mm)) next to the column 106 in the region that contained the metal foam.

The capture and release of paramagnetic particles was tested by using a dilute solution (0.022%) of 1 μm diameter superparamagnetic beads (Seradyn). This solution was made by adding 0.0119 g of a 5% stock solution of Seradyn beads to 2.7 ml of water. At this concentration the beads are easily visible as a reddish/brown slurry. When the magnet is held next to the tube and about 0.5 ml of bead solution is passed over the foam, all visible beads are trapped in the foam, and a clear water solution passes through the foam. When the magnet is removed and the water is pushed back over the foam, the magnetic particles are removed from the foam and again suspended in the water to form a reddish-brown solution. This process of capture and release can be easily and quickly repeated. A flow rate as high as about 4 ml/min (linear flow rate=7 mm/s) was used to capture the particles, and all flowrates tested were suitable for releasing the particles. If releasing and mixing particles in the solution is desired, then high flowrates (>4 ml/min) should be used.

EXAMPLE 2

Additional experiments were conducted to test the automated capture, release, and perfusion of paramagnetic particles using the monolithic porous foam. The process of capture and release was automated by using a sequential injection system (includes pump 300, holding coil 304, two-way valve 306 ) for controlling of solution flow in both the forward and reverse directions, and a stepper motor 306 for moving the magnet 108 as shown in FIG. 3. No temperature control was used.

The magnetic particles 100 and metal foam were as in Example 1.

TABLE 1a

Sample Procedure For Continuous Perfusion

| Bead Action | port/action | Direction | Volume | Flowrate |
|---|---|---|---|---|
| | Air | Aspirate | 100 μl | 20 μl/s |
| | Beads | Aspirate | 500 μl | 50 μl/s |
| | Magnet on | | | |
| Trap beads in column | Column | Dispense | 600 μl | 50 μl/s |
| | Air | Aspirate | 100 μl | 20 μl/s |
| | Sample | Aspirate | 200 μl | 50 μl/s |
| Perfuse column with sample | Column | Dispense | 200 μl | 10 μl/s |
| | Magnet off | | | |
| Flush beads from column | empty syringe | Dispense | | 200 μl/s |

TABLE 1b

Sample Procedure for Repeated Trapping and Releasing

| Bead Action | Port/action | Direction | Volume | Flowrate |
|---|---|---|---|---|
| | Air | Aspirate | 100 μl | 20 μl/s |
| | Beads | Aspirate | 500 μl | 50 μl/s |
| | Magnet on | | | |

TABLE 1b-continued

Sample Procedure for Repeated Trapping and Releasing

| Bead Action | Port/action | Direction | Volume | Flowrate |
|---|---|---|---|---|
| Trap beads in column | Column | Dispense | 600 μl | 50 μl/s |
| | Air | Aspirate | 100 μl | 20 μl/s |
| | Sample | Aspirate | 200 μl | 50 μl/s |
| Perfuse column with sample | Column | Dispense | 200 μl | 50 μl/s |
| | Magnet off | | | |
| *Resuspend beads into sample | Column | Aspirate | 200 μl | 300 μl/s |
| | Magnet on | | | |
| Trap beads | Column | Dispense | 200 | 50 μl/s |
| Return to * to resuspend beads, or continue to flush beads | Magnet off | | | |
| Flush beads from column | Empty syringe | Dispense | | 200 μl/s |

Sample procedures for repeated capture and release into a small sample volume and continuous perfusion with a sample volume are summarized in Tables 1a and 1b. Prior to the beginning of the procedures, the lines are filled with water and the 1 ml syringe contains 400 μl water (or other carrier solution such as a salt solution). Complete bead capture was achieved using a flow rate of 50 μl/s (5.2 mm/s linear flow rate), and the maximum perfusion flow rate through the column with no visible bead loss was 150 μl/s (15.6 mm/s linear flow rate).

EXAMPLE 3

An experiment was conducted to demonstrate the use of monolithic porous foam as the permeable magnetic flux conductor for manipulating superparamagnetic particles in a DNA extraction procedure.

The metal foam was as described in Example 1, but was cored to a diameter of only 0.05 inches (1.3 mm) by using ice-cold wax as a coring support. A thin-walled copper hollow cylinder was used to core a 5 mm thick slab of foam. The copper cylinder was made by drilling out a 0.8 mm I.D. 1/16" O.D. copper tube with a 0.05" drill. The resulting copper cylinder was 0.007" thick and 0.053" I.D. A rod was used to push the foam core out of the copper cylinder and the wax was removed from the foam by melting it with a soldering iron while soaking it up with a tissue paper. The resulting cylinder of nickel foam (1.3 mm diameter and 5 mm long) was inserted into a 2 mm I.D. piece of tubing (PTFE) that was heated in the vicinity of the nickel foam to form a channel of 1.3 mm I.D. with a wall thickness of 0.5 mm.

The paramagnetic particles 100 were streptavidin coated Promega beads (0.5–1 μm diameter), that were derivatized with biotinylated oligonucleotide. The oligonucleotide sequence was the 519 rDNA sequence: 5' TTA-CCG-CGG-CKG-CTG 3'. This oligonucleotide sequence is also present in the bacterial DNA that is to be purified. The beads were suspended in 0.5X SSC (20X SSC=3M NaCl, 0.3 M sodium citrate, pH 7.0) at a concentration of 0.016%.

The DNA was 100 ng of *Geobacter chapellii* DNA. A bead beater was used to lyse the bacterial cells and to produce DNA fragments between 4,000 to 10,000 base-pairs. The DNA fragments were dissolved in 200 microliters of an extraction buffer solution of 0.2 M sodium phosphate, 0.1 M EDTA, and 0.25% sodium dodecylsulfate that is used to release DNA from soil samples into solution as a DNA sample. The DNA sample was denatured at 95° C. for 5 minutes and placed on ice for 30 seconds prior to delivery of the DNA sample to the monolithic foam.

A summary of an automated DNA extraction procedure is shown in Table 2. This procedure includes trapping the particles, releasing the particles into the 200 μl sample, containing bacterial DNA, then rapidly moving the sample repeatedly up and down across the monolithic foam with no magnetic field applied in order to mix the beads and the sample. Finally the beads are trapped on the metal foam and water is used to elute the captured DNA from the beads.

Success of the extraction was confirmed by polymerase chain reaction (PCR) amplification specific for the target DNA in the eluant. The DNA was detected on a gel electrophoresis separation of the PCR mixture.

A blank was prepared with the identical steps but omitting the DNA.

TABLE 2

DNA purification steps at the Ni foam core.

| Procedural Step | Solution | Direction | Volume | Flowrate | field |
|---|---|---|---|---|---|
| Load the Ni foam | Air | Aspirate | 100 μl | 5 μl/s | on |
| With beads | Beads | Aspirate | 300 μl | 5 μl/s | on |
| Release the beads | Air | Aspirate | 100 μl | 50 μl/s | on |
| Into the sample | Sample | Aspirate | 200 μl | 50 μl/s | off |
| Mix beads and | Same | Inject | 180 μl | 30 μl/s | off |
| sample (repeat 5 times) | Same | Aspirate | 180 μl | 30 μl/s | off |
| Recapture beads | Same | Inject | 200 μl | 30 μl/s | off |
| | Same | Aspirate | 300 μl | 5 μl/s | on |
| Release beads into | Air | Inject | 100 μl | 10 μl/s | on |
| DNA stringency wash | SDS/ 0.5 × SSC | Inject | 90 μl | 30 μl/s | off |
| Mix | Same | Aspirate | 70 μl | 30 μl/s | off |
| (repeat 2 times) | Same | Inject | 70 μl | 30 μl/s | off |
| Recapture beads | Same | Aspirate | 90 μl | 5 μl/s | on |
| Release the beads | Air | Inject | 100 μl | 300 μl/s | off |
| Into pure water | Water | Inject | 90 μl | 300 μl/s | off |
| Mix | Same | Aspirate | 70 μl | 30 μl/s | off |
| (repeat 2 times) | Same | Inject | 70 μl | 30 μl/s | off |
| Recapture beads | Same | Aspirate | 90 μl | 5 μl/s | on |
| Deliver DNA eluent | Same | Inject | 200 μl | 5 μl/s | on |
| Destroy residual DNA | DNA Zap mix | Inject | 100 μl | 5 μl/s | off |

Figure 5:
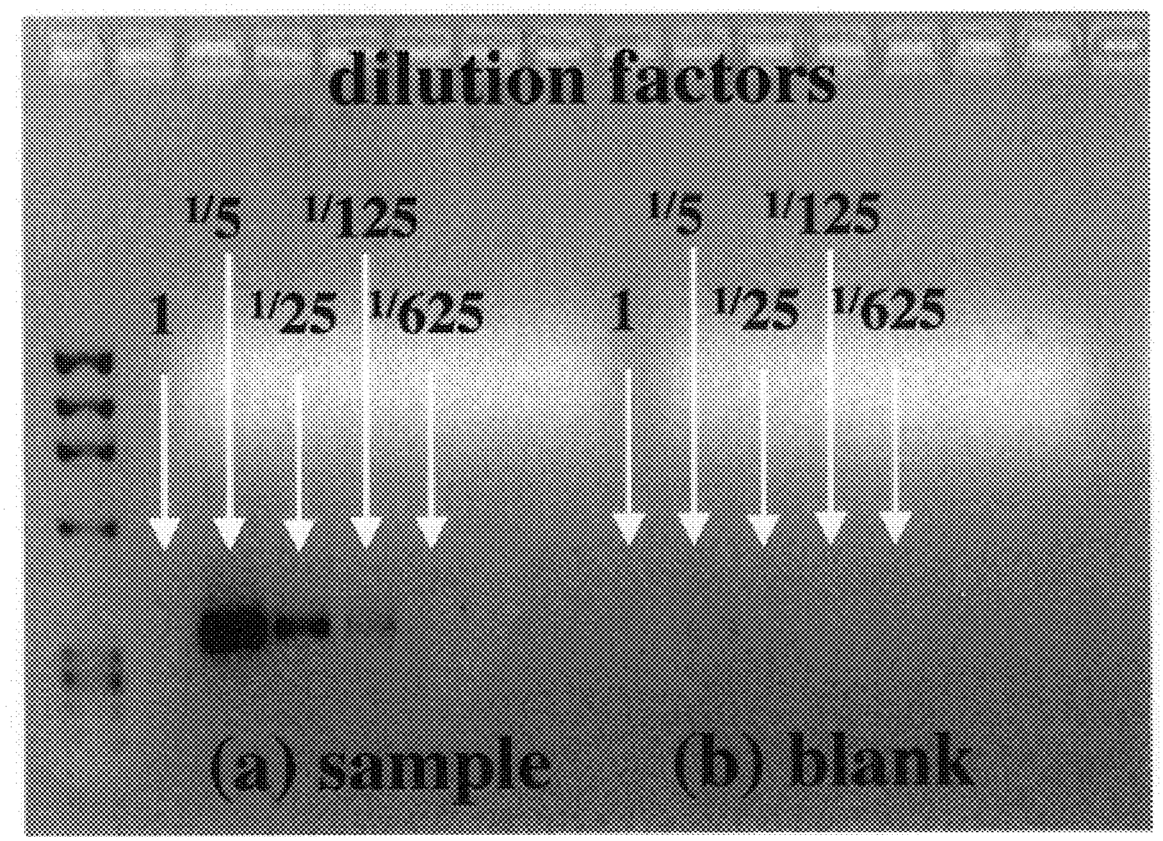
FIG. 5 is an electrophoresis image of DNA separated using the present invention and a blank.

Results are shown in FIG. 5, comparing two electrophoresis channels: one containing DNA and one blank sample. This shows that the present invention can be used to extract DNA, and no detectable DNA is carried over to a subsequent blank sample.

EXAMPLE 4

An experiment was conducted to demonstrate gentle magnetic particle release by the cancellation of residual magnetism in the monolithic porous foam. The experimental system was as in either Example 1 or Example 2. The monolithic porous foam was a Ni foam core. The electromagnet was taken from a Magnetec part number CC-3642 solenoid actuator. It satisfied the conditions of having a coil wrapped around the Ni core, and having a yolk of high magnetic permeability to enhance field strength through the Ni foam center of the coil.

Step 1) The electromagnet was placed surrounding a 2.2 mm diameter Ni core and was applied at 0.4 amperes for 60 seconds, just as in a bead capture step.

Step 2) The foam was freed of captured particles that could be released at 20 uL/s by injecting water at 200 uL/s.

Step 3) 100 uL of a 0.058% Seradyne suspension were injected at 20 uL/s so that particles were captured by residual magnetism.

Figure 6:
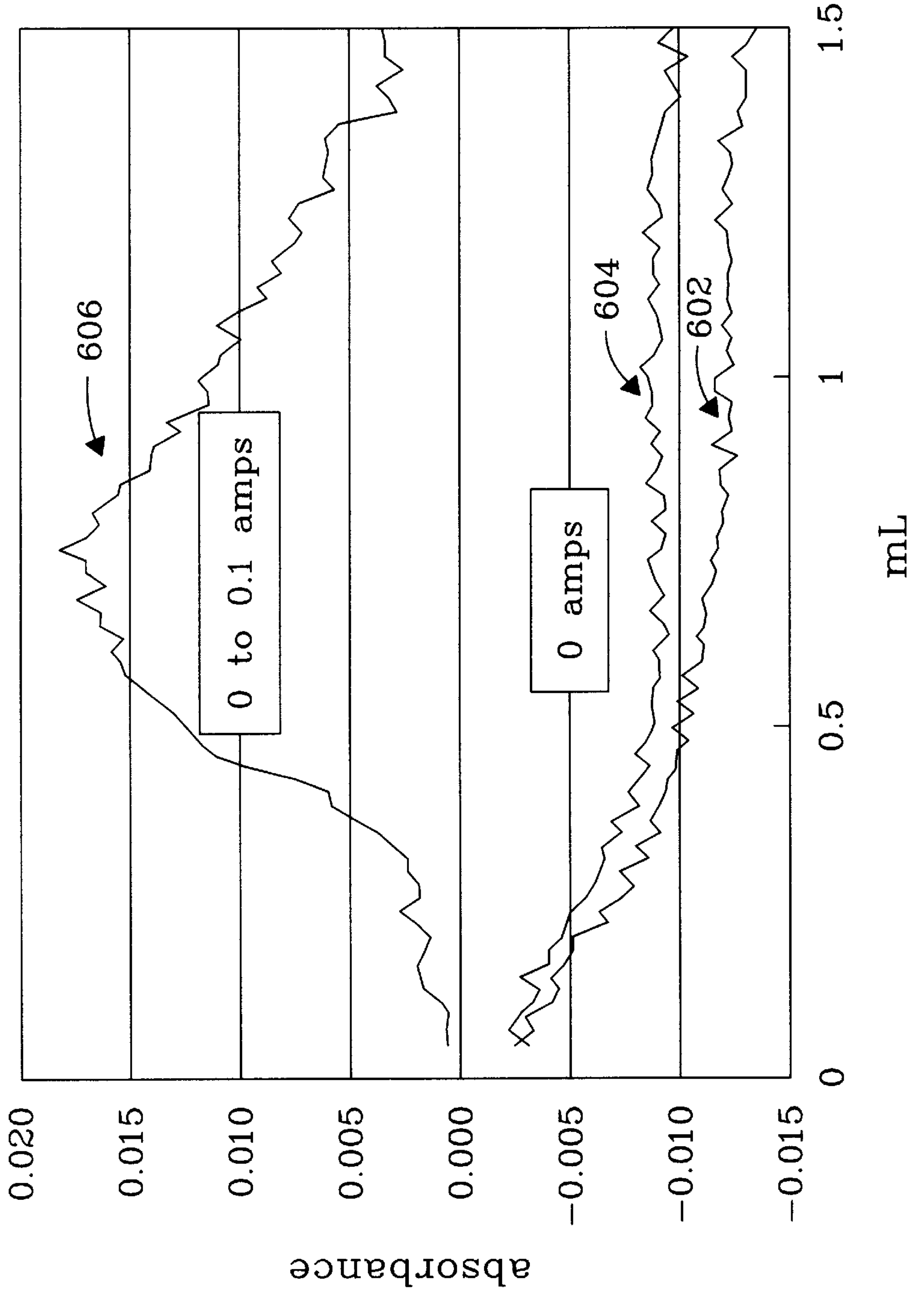
FIG. 6 is a plot showing the release of magnetic particles in an Ni foam core by the cancellation of residual magnetism in the core.

Step 4) The captured particles were confirmed to not be released during further perfusion with pure water at 20 uL/s. FIG. 6 shows two baseline curves labeled "0 amps" 602, 604 which are the absorbance at 720 nm monitored through a 1.7 cm pathlength downstream of the Ni core during 20 uL/s perfusion with pure water for 60 seconds. The initial downward slope was a repeatable artifact due to the flow cell. The baseline curves 602, 604 were the same as for the Ni core cleansed by 200 uL/s perfusions.

Step 5) The optical path was monitored downstream of the Ni core during 20 uL/s perfusion, as in step 4; but this time residual magnetism was canceled during the perfusion. Current was increased from 0 to 0.1 amperes with reversed polarity during perfusion. The peak labeled "0 to 0.1 amps" 606 in FIG. 6 shows that particles were released as residual field gradients were canceled.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for handling magnetic particles in a fluid, the apparatus having:

a magnetic flux conductor that is permeable thereby permitting said magnetic particles and said fluid to flow therethrough;

a controllable magnetic field for adjusting a magnetic field within said magnetic flux conductor for the handling of said magnetic particles; wherein the improvement comprises:

said controllable magnetic field is capable of being adjusted to a first polarity for retaining said magnetic particles in said magnetic flux conductor and being reversed to the opposite polarity for releasing said magnetic particles from said magnetic flux conductor.

2. The apparatus as recited in claim 1, wherein said magnetic particles together with said fluid and said magnetic flux conductor are placed in a column between an inlet and an outlet.

3. The apparatus as recited in claim 2, wherein said controllable magnetic field is provided by a magnet placed external to said column and proximate said magnetic flux conductor.

4. The apparatus as recited in claim 3, wherein said magnet is a permanent magnet.

5. The apparatus as recited in claim 3, wherein said magnet is an electromagnet.

6. The apparatus as recited in claim 5, wherein said electromagnet surrounds said magnetic flux conductor.

7. The apparatus as recited in claim 2, further comprising a temperature control for controlling a temperature of said fluid within said column.

8. The apparatus as recited in claim 1, wherein said magnetic flux conductor is a monolithic porous foam.

9. The apparatus as recited in claim 8, wherein the ratio of the average pore size of said monolithic porous foam to the average magnetic particle size in said fluid is at least 20.

10. A method for handling magnetic particles in a fluid, the method having the steps of:

flowing said fluid with said suspended magnetic particles through a magnetic flux conductor that is permeable;

controlling a controllable magnetic field for adjusting a magnetic field within said magnetic flux conductor for the handling of said magnetic particles; wherein the improvement comprises:

said magnetic flux conductor is a monolithic porous foam;

said magnetic particles together with said fluid and said monolithic porous foam are placed in a column between an inlet and an outlet;

said controllable magnetic field is provided by an electromagnet placed external to said column and surrounds said monolithic porous foam; and the polarity of said electromagnet is reversed for release of said magnetic particles.

11. The method as recited in claim a, further comprising a temperature control for controlling a temperature of said fluid within said column.

12. The method as recited in claim 10, further comprising the step of decreasing said magnetic field to zero after the step of reversing said magnetic field.

13. A method for handling magnetic particles in a fluid, the method having the steps of:

flowing said fluid with said suspended magnetic particles through a magnetic flux conductor that is permeable;

controlling a controllable magnetic field for adjusting a magnetic field within the magnetic flux conductor for the handling of the magnetic particles;

wherein the improvement comprises:

said controlling has the steps of (a) applying a magnetic field of a first polarity for retaining said magnetic particles in said magnetic flux conductor; and (b) reversing said magnetic field to the opposite polarity for releasing said magnetic particles from said magnetic flux conductor.

14. The method as recited in claim 13, wherein said opposite polarity is increased.

15. The method as recited in claim 13, wherein said magnetic flux conductor is selected from the group consisting of filamentous, wire loop, rod, monolithic porous foam and combinations thereof.

16. A method of contacting magnetic particles with a sample fluid, comprising the steps of:

(a) flowing a fluid with magnetic particles therein through a magnetic flux conductor that is permeable;

(b) applying a magnetic field of a first polarity within said magnetic flux conductor for retaining said magnetic particles within said magnetic flux conductor;

(c) flowing said sample fluid through said magnetic flux conductor;

(d) stopping the flow of said sample fluid and reversing said magnetic field to the opposite polarity for releasing said magnetic particles from said magnetic flux conductor into said sample fluid; and (e) flowing said sample fluid with said released magnetic particles through said magnetic flux conductor in a first direction.

17. The method as recited in claim 16, further comprising the step of decreasing said magnetic field to zero after step (d).

18. The method as recited in claim 16, further comprising the step of reapplying said magnetic field of said first polarity after step (e) for retaining said magnetic particles within said magnetic flux conductor.

19. The method as recited in claim 16, further comprising the step of flowing said sample fluid with said released magnetic particles through said magnetic flux conductor in the opposite direction after step (e).

20. The method as recited in claim 19, further comprising the step of reapplying said magnetic field of said first polarity for retaining said magnetic particles within said magnetic flux conductor.

21. The method as recited in claim 19, wherein said magnetic flux conductor is a monolithic porous foam.

22. The method as recited in claim 21, wherein the ratio of the average pore size of said monolithic porous foam to the average magnetic particle size in said fluid is at least 20.

* * * * *